June 4, 1968     C. HADDAD     3,386,310

THREE-ELEMENT PUSH-PULL CABLE ASSEMBLY

Filed April 5, 1966     2 Sheets-Sheet 1

CHARLES HADDAD
INVENTOR.

BY John R. Faulkner
Robert E. McCollum
ATTORNEY

June 4, 1968  C. HADDAD  3,386,310
THREE-ELEMENT PUSH-PULL CABLE ASSEMBLY
Filed April 5, 1966  2 Sheets-Sheet 2

CHARLES HADDAD
INVENTOR.

BY John W. Faulkner
Robert E. McCollum
ATTORNEYS

United States Patent Office 3,386,310
Patented June 4, 1968

3,386,310
THREE-ELEMENT PUSH-PULL
CABLE ASSEMBLY
Charles Haddad, Allen Park, Mich., assignor to Ford
Motor Company, Dearborn, Mich., a corporation of
Delaware
Filed Apr. 5, 1966, Ser. No. 540,361
3 Claims. (Cl. 74—501)

ABSTRACT OF THE DISCLOSURE

A three-element, power transmitting cable assembly for transmitting power along a curvilinear path. A flexible wire is surrounded by a flexible, power transmitting tubular case that is surrounded by a flexible, tubular sheath. Means are provided for taking up slack in the wire such that the wire urges the power transmitting case against the inner surface of the sheath at bends in said assembly to reduce backlash.

This invention relates to a flexible power transmitting mechanism and in particular to a three-element push-pull cable assembly.

Flexible power transmitting mechanisms known as Bowden wires are well known in the art. A Bowden wire comprises a pair of elongated elements, one disposed within the other, whereby one will serve as a guide for the other. Power is transmitted by relative sliding movement between the two elements. A disadvantage attendant the use of such mechanisms is the presence of backlash.

It is, therefore, the object of this invention to provide a flexible power transmitting mechanism comprising a three-element push-pull cable assembly that may be adjusted so as to reduce or completely eliminate backlash.

A cable assembly constructed in accordance with this invention includes a wire enclosed along a substantial length thereof by a tubular intermediate casing. The intermediate casing is enclosed along a substantial length thereof by a tubular outer casing. Both ends of the wire and the outer casing are fixed so as to prevent movement. The intermediate casing, which provides power transmission, has one end attached to a movable actuating member and its other end attached to the member to be actuated. Means are provided to adjust the fixed position of one end of the wire thereby taking up the slack in the wire thereby reducing or completely eliminating backlash.

Further objects and advantages of this invention will become apparent when the following description is considered in connection with the accompanying drawings in which.

Figure 1:
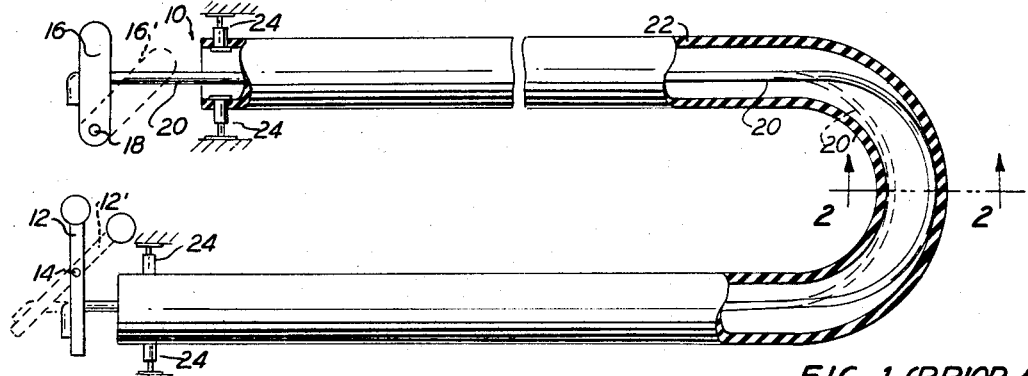
FIGURE 1 is a schematic view, partially in section, of a conventional flexible power transmitting mechanism.
Figure 2:
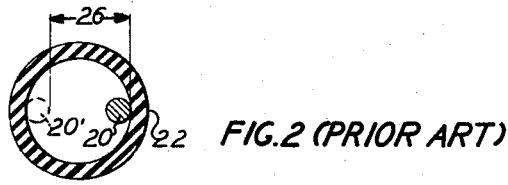
FIGURE 2 is an enlarged sectional view taken along the line 2—2 of FIGURE 1.

Referring to FIGURE 1, a conventional flexible power transmitting mechanism 10 is shown connecting in actuating lever 12 and a member 16 to be actuated. Actuating lever 12 is pivoted at 14 so that its movement to a position 12', shown in ghost, will cause member 16, pivoted at 18, to move to the position 16', shown in ghost. Power to accomplish this movement is transmitted by a wire 20 securely attached to lever 12 and member 16. A flexible outer casing 22 surrounds wire 20 along a substantial length thereof, thereby serving as a guide for a wire 20. Suitable fastening means 24 secure the ends of outer casing 22 against movement.

Because of the flexibility of wire 20, movement of actuating lever 12 must cause wire 20 to move into the ghost position 20, thereby taking up all slack in wire 20, before movement of member 16 will occur. (It is to be understood that certain dimensions in FIGURE 1 are greatly exaggerated for purposes of clarity.) Of course, movement of lever 12 from the position 12' to its original position must be sufficient to return wire 20 from the position 20' to its original position before member 16 can be returned from the position 16'. Also for this return movement to be possible, wire 20 must be of sufficient diameter to have a substantial degree of rigidity.

The magnitude of movement of actuating lever 12 necessary to take up the slack in wire 20 before corresponding movement of member 16 will occur is known as backlash. For a single bend arrangement, such as that shown in FIGURE 1, the movement of wire 20 at the apex of the bend is equal to the interior diameter of outer casing 22 less the diameter of wire 20. This dimension is illustrated by the reference numeral 26.

Figure 3:
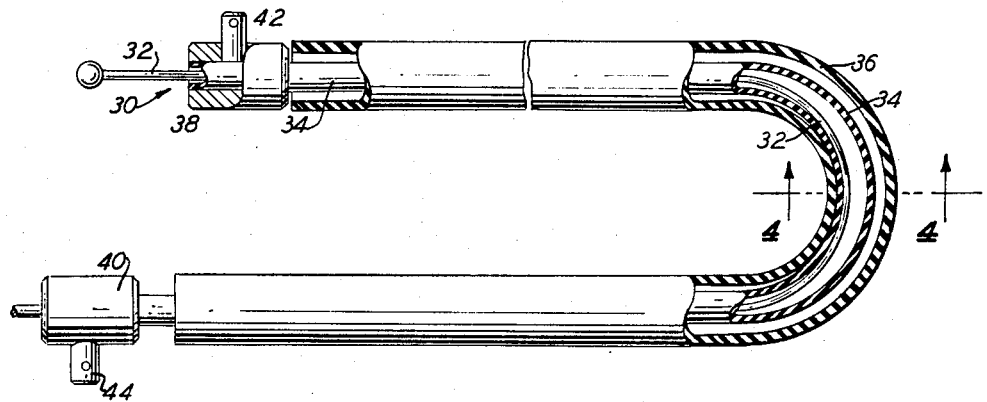
FIGURE 3 is a schematic representation, partially in section, of a three-element cable assembly constructed in accordance with this invention.

In FIGURE 3, a three-element cable assembly constructed in accordance with this invention is designated by the numeral 30 and comprises a wire 32, that may be ordinary piano wire, an intermediate casing 34 of tubular cross-section, and an outer tubular casing 36. The ends of both wire 32 and outer casing 36 are secured against movement by suitable fastening means (not illustrated in FIGURE 3). End fitting 38 and 40 are secured to the ends of intermediate casing 34. Pins 42 and 44 are provided on these end fittings to facilitate attachment of the end fittings to an actuating member and a member to be actuated.

Figure 4:
FIGURE 4 is an enlarged sectional view taken along the line 4—4 of FIGURE 3.

Means (not illustrated in FIGURE 3) are provided for adjusting the fixed position of one end of wire 32. Of course, controlled adjustment of one end of wire 32 relative to casings 34 and 36, can be used to adjust the slack in wire 32, and thus adjust the backlash present in the cable assembly. This may be seen by reference to FIGURE 4 which illustrates the three-element cable assembly when all the slack has been removed from wire 32. It may be seen that intermediate casing 34, the power transmitting member of the cable assembly, is held between wire 32 and outer casing 36. For instance, when end fitting 40 is moved to the left, any lost motion tendency of casing 34, due to its flexibility, is suppressed by outer casing 36 which easily bears the compressive forces against it. When end fitting 40 is moved to the right, wire 32 prevents a lost motion movement of casing 34 since the wire 32 is capable of bearing tension without moving. Also, wire 40, that bears only tension, and casing 34 need have no rigidity in order for power to be transmitted in both directions.

Movement of an actuating member secured to one end of intermediate casing 34, will thus cause corresponding movement of a member to be actuated secured to the other end of intermediate casing 34 without the presence of backlash or lost motion. It should be obvious to one having skill in the art that the initial fixed position of wire 32 may be adjusted so as to permit any degree of backlash desired, or the slack in wire 32 may be taken up to the extent that wire 32 will be preloaded in tension, thereby putting the small radius wall of casing 36 in compression, to cause a frictional load to be placed upon intermediate casing 34.

Figure 5:
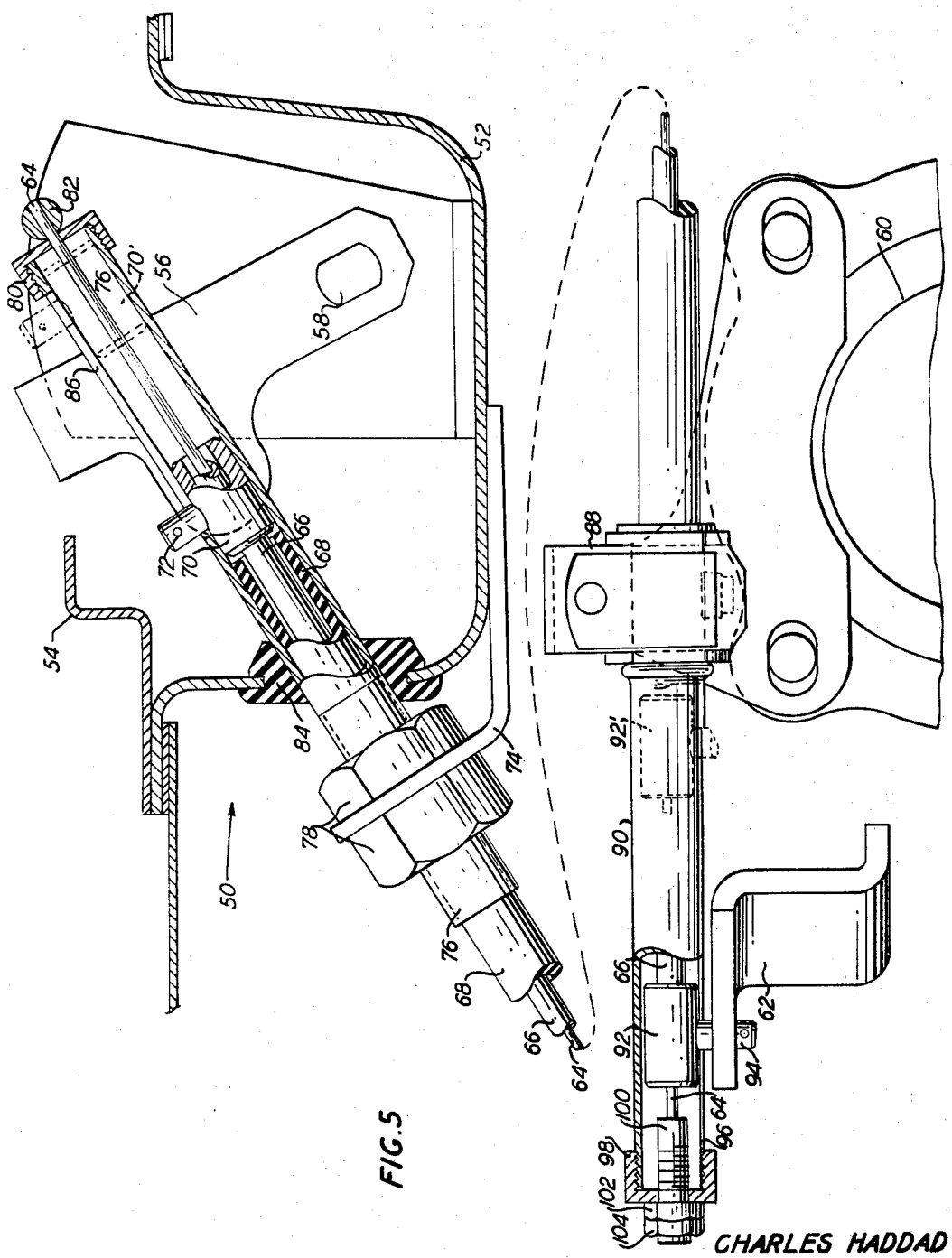
FIGURE 5 is an illustration of an application of the three-element cable assembly shown in FIGURES 3 and 4.

Referring now to FIGURE 5, the numeral 50 denotes an arrangement utilizing the three-element cable assembly of this invention for actuating a transmission shift lever in response to movement of an operator controlled gear ratio selector lever. The floor 52 of the vehicle passenger compartment cooperates with a console covering 54 to provide space wherein manually operated selector lever 56 may be pivoted by shaft 58. A transmission, shown partially at 60, has a shift lever 62 controlling the selection of gear ratios in the transmission.

Selector lever 56 and shift lever 62 are connected by a three-element cable assembly comprising a wire 64, and intermediate actuating casing 66 and an outer casing 68. Intermediate casing 66 is secured, proximate selector lever 56, to an end fitting 70 having a pin 72 that facilitates attachment of fitting 70 to lever 56. (For the sake of clarity the particular attachment of pin 72 to lever 56 is not shown.)

Outer casing 68 is held stationary in that it is forced into sleeve 76 which is held in an aperture through a bracket 74 by means of lock nuts 78. The end of sleeve 76 remote from bracket 74 has external threads formed thereon which cooperate with the internal threads of a cap 80. Outer casing 68 terminates short of end fitting 70. However, wire 64 extends through end fitting 70 and cap 80 and is held stationary by means of ball 82 secured to its end. A rubber seal 84, through which the cable assembly passes, prevents the entry of dust and dirt into the passenger compartment of the vehicle.

As discussed above, movement of intermediate sleeve 66 is made possible by the attachment of end fitting 70 to selector lever 56 by means of pin 72. A slot 86 is formed in sleeve 76 to permit the protrusion of pin 72 from sleeve 76 and allow movement of end fitting 70 and pin 72 while sleeve 76 remains stationary. It may thus be seen that movement of lever 56 in a clockwise direction will cause a linear movement of intermediate sleeve 66, end fitting 70 and pin 72, in the same direction so that end fitting 70 is in the position 70' shown in ghost.

The end of the three-element cable assembly remote from the gearshift lever is attached by means of a suitable bracket 88 that is attached to the casing of transmission 60. Bracket 88 holds a sleeve 90 against movement. The three-element cable extends into the sleeve 90 where intermediate casing 66 is secured to end fitting 92. The end fitting has a pin 94 that is attached to the transmission shift lever 62. Wire 64 extends through end fitting 92 and has secured to its end a threaded end fitting 100. Threaded end fitting 100 extends through threaded cap 98 that is secured to the end of sleeve 90 and cooperates with an adjusting nut 102.

It is readily apparent that by turning nut 102 on threaded end fitting 100, slack in wire 64 can be taken up and completely eliminated as described above. After completion of the adjustment of the slack in wire 64 a lock nut 104 may be threaded onto end fitting 100 to render permanent the adjustment of the slack in wire 64.

Movement of intermediate casing 66 and end fitting 92 in sleeve 90 is made possible by a slot 96 formed in the body of sleeve 90 through which protrudes pin 94.

It may thus be seen that applicant has provided a three-element push-pull cable assembly that does not require a rigid power transmitting member and that may be adjusted to eliminate or substantially adjust backlash to any desired degree.

It is to be understood that the invention is not to be limited to the exact construction shown and described above and that various changes and modifications may be made without department from the spirit and scope of the invention as defined in the appended claims.

I claim:

1. A push-pull actuating cable assembly comprising a wire having both ends thereof secured against movement, a movable tubular intermediate casing surrounding said wire, means securing opposite ends of said intermediate casing respectively to a movable actuating member and to a member to be actuated, a tubular outer casing surrounding said intermediate casing and having both ends thereof secured against movement, and adjusting means cooperating with one end of said wire for taking up slack in said wire and minimizing radial movement of said intermediate casing relative to said wire and outer casing thereby reducing backlash in said cable assembly by holding a portion of said intermediate casing against said outer casing with said wire.

2. A push-pull actuating cable assembly for transmitting power along a curvilinear path and comprising an elongate flexible member, a movable tubular intermediate casing surrounding said flexible member and having one end thereof secured to a movable actuating member and the other end thereof secured to a member to be actuated, the inner diameter of said intermediate casing being greater than the outer dimension of said flexible member, a tubular outer casing surrounding said intermediate casing and having both ends thereof secured against movement, the inner diameter of said outer casing being greater than the other diameter of said intermediate casing, and adjustment means secured to one end of said flexible member and capable of moving said one end to bring said wire into engagement with said intermediate casing and urge the latter against the inner surface of said outer casing at bends in said assembly.

3. The assembly of claim 2, wherein said flexible member is a wire.

References Cited

UNITED STATES PATENTS

| | | | |
|---|---|---|---|
| 732,057 | 6/1903 | Dring | 74—501 |
| 1,331,311 | 2/1920 | Au | 74—502 |
| 1,897,216 | 2/1933 | Schmidt. | |
| 1,934,953 | 11/1933 | Suiter | 74—513 X |
| 1,935,806 | 11/1933 | Mautsch | 74—501 X |
| 3,057,262 | 10/1962 | Jacobson | 74—501 |

FOREIGN PATENTS 963,979    7/1964    Great Britain.

FRED C. MATTERN, JR., *Primary Examiner.*

C. F. GREEN, *Assistant Examiner.*